United States Patent
Carbune et al.

(10) Patent No.: US 10,559,309 B2
(45) Date of Patent: Feb. 11, 2020

(54) COLLABORATIVE VOICE CONTROLLED DEVICES

(71) Applicant: Google LLC, Mountain View, CA (US)

(72) Inventors: Victor Carbune, Basel (CH); Pedro Gonnet Anders, Zurich (CH); Thomas Deselaers, Zurich (CH); Sandro Feuz, Zurich (CH)

(73) Assignee: Google LLC, Mountain View, CA (US)

( * ) Notice: Subject to any disclaimer, the term of this patent is extended or adjusted under 35 U.S.C. 154(b) by 356 days.

(21) Appl. No.: 15/387,884

(22) Filed: Dec. 22, 2016

(65) Prior Publication Data

US 2018/0182397 A1    Jun. 28, 2018

(51) Int. Cl.
| | |
|---|---|
| G10L 15/30 | (2013.01) |
| G10L 15/22 | (2006.01) |
| G10L 13/033 | (2013.01) |
| H04W 4/80 | (2018.01) |
| G10L 15/08 | (2006.01) |
| G10L 13/08 | (2013.01) |

(52) U.S. Cl.
CPC .............. G10L 15/30 (2013.01); G10L 15/22 (2013.01); *G10L 13/033* (2013.01); *G10L 13/08* (2013.01); *G10L 2015/088* (2013.01); *G10L 2015/223* (2013.01); *G10L 2015/228* (2013.01); *H04W 4/80* (2018.02)

(58) Field of Classification Search
CPC ......... G10L 15/08; G10L 15/18; G10L 15/30; G10L 15/22
See application file for complete search history.

(56) References Cited

U.S. PATENT DOCUMENTS

| | | | |
|---|---|---|---|
| 4,363,102 A | 12/1982 | Holmgren | |
| 5,659,665 A | 8/1997 | Whelpley, Jr. | |

(Continued)

FOREIGN PATENT DOCUMENTS

| | | |
|---|---|---|
| CN | 105554283 | 5/2016 |
| EP | 1511277 | 3/2005 |

(Continued)

OTHER PUBLICATIONS

International Search Report and Written Opinion issued in the International Application No. PCT/US2017/045107, dated Oct. 2, 2017, 11 pages.

(Continued)

*Primary Examiner* — Michael N Opsasnick
(74) *Attorney, Agent, or Firm* — Fish & Richardson P.C.

(57) ABSTRACT

Methods, systems, and apparatus, including computer programs encoded on a computer storage medium, for collaboration between multiple voice controlled devices are disclosed. In one aspect, a method includes the actions of identifying, by a first computing device, a second computing device that is configured to respond to a particular, predefined hotword; receiving audio data that corresponds to an utterance; receiving a transcription of additional audio data outputted by the second computing device in response to the utterance; based on the transcription of the additional audio data and based on the utterance, generating a transcription that corresponds to a response to the additional audio data; and providing, for output, the transcription that corresponds to the response.

19 Claims, 3 Drawing Sheets

(56) References Cited

U.S. PATENT DOCUMENTS

| | | |
|---|---|---|
| 5,897,616 A | 4/1999 | Kanevsky |
| 5,983,186 A | 11/1999 | Miyazawa et al. |
| 6,141,644 A | 10/2000 | Kuhn |
| 6,567,775 B1 | 5/2003 | Maali |
| 6,671,672 B1 | 12/2003 | Heck |
| 6,744,860 B1 | 6/2004 | Schrage |
| 6,826,159 B1 | 11/2004 | Shaffer |
| 6,931,375 B1 | 8/2005 | Bossemeyer |
| 6,973,426 B1 | 12/2005 | Schier |
| 7,016,833 B2 | 3/2006 | Gable |
| 7,222,072 B2 | 5/2007 | Chang |
| 7,720,012 B1 | 5/2010 | Borah |
| 7,904,297 B2 | 3/2011 | Mirkovic et al. |
| 8,099,288 B2 | 1/2012 | Zhang |
| 8,200,488 B2 | 6/2012 | Kemp et al. |
| 8,209,174 B2 | 6/2012 | Al-Telmissani |
| 8,340,975 B1 * | 12/2012 | Rosenberger ........... G10L 15/22 704/270 |
| 8,717,949 B2 | 5/2014 | Crinon |
| 8,719,018 B2 | 5/2014 | Dinerstein |
| 8,768,687 B1 | 7/2014 | Quasthoff et al. |
| 8,775,191 B1 | 7/2014 | Sharifi et al. |
| 8,996,372 B1 | 3/2015 | Secker-Walker et al. |
| 9,053,710 B1 * | 6/2015 | Zehr ...................... H03G 5/165 |
| 9,142,218 B2 | 9/2015 | Schroeter |
| 9,431,021 B1 | 8/2016 | Scalise et al. |
| 2002/0049596 A1 | 4/2002 | Burchard et al. |
| 2002/0072905 A1 | 6/2002 | White |
| 2002/0123890 A1 | 9/2002 | Kopp |
| 2002/0193991 A1 | 12/2002 | Bennett et al. |
| 2003/0200090 A1 | 10/2003 | Kawazoe |
| 2003/0231746 A1 | 12/2003 | Hunter |
| 2004/0101112 A1 | 5/2004 | Kuo |
| 2005/0165607 A1 | 7/2005 | Di Fabbrizio et al. |
| 2006/0074656 A1 | 4/2006 | Mathias et al. |
| 2006/0184370 A1 | 8/2006 | Kwak et al. |
| 2007/0100620 A1 | 5/2007 | Tavares |
| 2007/0798262 | 8/2007 | Mindlin |
| 2008/0252595 A1 | 10/2008 | Boillot |
| 2009/0204409 A1 * | 8/2009 | Mozer ..................... G10L 15/30 704/275 |
| 2009/0258333 A1 | 10/2009 | Yu |
| 2009/0292541 A1 | 11/2009 | Daya |
| 2010/0070276 A1 | 3/2010 | Wasserblat |
| 2010/0110834 A1 | 5/2010 | Kim |
| 2011/0026722 A1 | 2/2011 | Jing |
| 2011/0054892 A1 | 3/2011 | Jung |
| 2011/0060587 A1 | 3/2011 | Phillips et al. |
| 2011/0066429 A1 | 3/2011 | Shperling |
| 2011/0304648 A1 | 12/2011 | Kim |
| 2012/0079095 A1 * | 3/2012 | Evans ........................ G06F 8/61 709/224 |
| 2012/0084087 A1 | 4/2012 | Yang |
| 2012/0136923 A1 * | 5/2012 | Grube ..................... H04W 4/90 709/203 |
| 2012/0232896 A1 | 9/2012 | Taleb |
| 2012/0265528 A1 | 10/2012 | Gruber et al. |
| 2013/0060571 A1 | 3/2013 | Soemo et al. |
| 2013/0132086 A1 | 5/2013 | Xu et al. |
| 2013/0183944 A1 | 7/2013 | Mozer |
| 2014/0012573 A1 | 1/2014 | Hung |
| 2014/0012578 A1 | 1/2014 | Morioka |
| 2014/0088961 A1 | 3/2014 | Woodward et al. |
| 2014/0163978 A1 * | 6/2014 | Basye ..................... G10L 15/28 704/233 |
| 2014/0222430 A1 | 8/2014 | Rao |
| 2014/0257821 A1 | 9/2014 | Adams |
| 2014/0278383 A1 | 9/2014 | Fan |
| 2014/0278435 A1 | 9/2014 | Ganong, III |
| 2015/0019217 A1 | 1/2015 | Di Cristo et al. |
| 2015/0154953 A1 | 6/2015 | Bapat |
| 2015/0262577 A1 | 9/2015 | Nomura |
| 2016/0035353 A1 | 2/2016 | Chen et al. |
| 2016/0049152 A1 * | 2/2016 | Kennewick ............. G10L 15/18 704/257 |
| 2016/0104480 A1 * | 4/2016 | Sharifi .................... G10L 15/08 704/254 |
| 2016/0104483 A1 | 4/2016 | Foerster et al. |
| 2016/0217785 A1 * | 7/2016 | Kennewick ......... G10L 15/1822 |
| 2016/0260431 A1 | 9/2016 | Newendorp et al. |
| 2016/0314792 A1 * | 10/2016 | Alvarez Guevara ... G10L 15/08 |
| 2017/0243586 A1 * | 8/2017 | Civelli .................... G10L 15/32 |
| 2018/0061419 A1 * | 3/2018 | Melendo Casado .... G10L 15/22 |

FOREIGN PATENT DOCUMENTS

| | | |
|---|---|---|
| EP | 2674854 | 12/2013 |
| WO | 1998040875 | 9/1998 |
| WO | 2016/014142 | 1/2016 |
| WO | 2016/057269 | 4/2016 |
| WO | 2017/058648 | 4/2017 |

OTHER PUBLICATIONS

Singaporean Search Report and Opinion issued in Singaporean Application No. 10201707702Y, dated May 21, 2018, 11 pages.
International Preliminary Report on Patentability issued in International Application No. PCT/US2017/045107, dated Dec. 24, 2018, 5 pages.
Irish Search Report issued in Irish Application No. 2017/0206, dated May 11, 2018, 5 pages.
Office Action issued in British Application No. dated Mar. 6, 2018, 6 pages.
'Wikipedia.com' [online]. "Speaker Recognition," Dec. 2016, [Retrieved on Dec. 22, 2016] Retrieved from the Internet: URL<http://en.wikipedia.org/Speaker_recognition > 6 pages.
'nuance.es' [online]. "Voice Biometrics Evaluation Studio™ 8.2 :: Product Description," 2012, [retrieved from internet Dec. 22, 2016] Retrieved from Internet: URL<http://www.nuance.es/ucmprod/gropus/enterprise/@web-enus/documents/collateral/nc_018618.pdf>.
François et al., "Speaker and Noise Independent Voice Activity Detection," Interspeech, Mar. 26, 2013, 9 pages.
Hurmalainen et al., "Detection, Separation and Recognition of Speech from Continuous Signals Using Spectral Factorisation", 20th European Signal Processing Conference (EUSIPCO 2012), Bucharest, Romania, Aug. 27-31, 2012, 5 pages.
Kim et al., "Comparison of a Joint Iterative Method for Multiple Speaker Identification with Sequential Blind Source Separation and Speaker Identification", Proceedings of the 2008 IEEE Odyssey Workshop on Speaker and Language Recognition, Stellenbosch, South Africa, 8 pages.
Kotti, Margarita et al., "Speaker Segmentation and Clustering", Preprint submitted to Elsevier Preprint Oct. 31, 2007, 54 pages.
Kwon et al., "Unsupervised Speaker Indexing Using Generic Models", IEEE Transaction on Speech and Audio Processing, vol. 13, No. 5, Sep. 2005, 10 pages.
Maes et al., "Conversational Speech Biometrics," J. Liu and Y. Ye (Eds.): E-Commerce Agents, LNAI 2033, Springer-Verlag, Berlin Heidelberg 2001, 14 pages.
Navrátil et al., "A Speech Biometrics System with Multi-Grained Speaker Modeling", 2000, 5 pages.
Ramirez, Javier et al., "Statistical Voice Activity Detection Using a Multiple Observation Likelihood Ratio Test", IEEE Signal Processing Letters, vol. 12, No. 10, Oct. 2005, 4 pages.
Schabus et al., "Objective and Subjective Feature Evaluation for Speaker-Adaptive visual Speech Synthesis", International Conference on Auditory-Visual Processing, 2013, 6 pages.
Walsh et al., "Joint Iterative Multi-Speaker Identification and Source Separation Using Expectation Propagation," Proceedings of the 2007 IEEE Workshop on Applications of Signal Processing to Audio and Acoustics, New Paltz, NY, 2007, 4 pages.
EP Extended European Search Report in EP Appln. No. 17883852.0, dated Dec. 20, 2019, 8 pages.

* cited by examiner

COLLABORATIVE VOICE CONTROLLED DEVICES

TECHNICAL FIELD

This specification generally relates to automated speech recognition.

BACKGROUND

The reality of a speech-enabled home or other environment—that is, one in which a user need only speak a query or command out loud and a computer-based system will field and answer the query and/or cause the command to be performed—is upon us. A speech-enabled environment (e.g., home, workplace, school, etc.) can be implemented using a network of connected microphone devices distributed throughout the various rooms or areas of the environment. Through such a network of microphones, a user has the power to orally query the system from essentially anywhere in the environment without the need to have a computer or other device in front of him/her or even nearby. For example, while cooking in the kitchen, a user might ask the system "how many milliliters in three cups?" and, in response, receive an answer from the system, e.g., in the form of synthesized voice output. Alternatively, a user might ask the system questions such as "when does my nearest gas station close," or, upon preparing to leave the house, "should I wear a coat today?" Further, a user may ask a query of the system, and/or issue a command, that relates to the user's personal information. For example, a user might ask the system "when is my meeting with John?" or command the system "remind me to call John when I get back home."

SUMMARY

Hotwords may be used in order to avoid picking up utterances made in the surrounding environment that are not directed to the system. A hotword (also referred to as an "attention word" or "voice action initiation command") is a predetermined word or term that is spoken to invoke the attention of the system. In an example environment, the hotword used to invoke the system's attention are the words "OK computer." When the system detects that the user has spoken the hotword, the system enters a ready state for receiving further user commands.

In speech-enabled environments, devices may be continuously listening for hotwords. When there are multiple devices in the same environment that are configured to respond to a particular hotword, any utterance including the hotword may trigger all the devices and provide redundant responses from the multiple devices. For example, Alice, Bob and Carl may be looking for a restaurant to go to for lunch. Alice may say "OK Computer, find me restaurants nearby". All three of their phones may simultaneously provide a response, e.g., a list of restaurants. To improve user experience, it may be desirable for the phones to communicate with one another to provide different responses in a coordinated fashion similar to an actual conversation. Alice's phone may provide a list of nearby restaurants and Bob's phone may provide a response selecting one of the restaurants in the list of nearby restaurants provided by Alice's phone. Carl's phone may provide a response approving the selected restaurant based on Carl's review of the restaurant on social media.

According to one innovative aspect of the subject matter described in this specification, a first computing device identifies one or more other computing devices that are configured to respond to a particular, predefined hotword. The first computing device receives an utterance that is spoken by a user. Before performing speech recognition on the audio data that corresponds to the utterance, the first computing device determines that the audio data includes the hotword, and that a second computing device is already processing the audio. The first computing device receives the response outputted by the second computing device in response to the utterance. Based on this response and the utterance, the first computing device generates a response and provides the response for output. Thus the first computing device augments the response from the second computing device and provides a new response which can provide additional information to the users.

In general, another innovative aspect of the subject matter described in this specification may be embodied in methods that include the actions of identifying, by a first computing device, a second computing device that is configured to respond to a particular, predefined hotword; receiving audio data that corresponds to an utterance; receiving a transcription of additional audio data outputted by the second computing device in response to the utterance; based on the transcription of the additional audio data and based on the utterance, generating a transcription that corresponds to a response to the additional audio data; and providing, for output, the transcription that corresponds to the response.

These and other embodiments can each optionally include one or more of the following features. In some implementations, providing, for output the transcription that corresponds to the response comprises providing an initial portion of the transcription to a speech synthesizer of the first computing device; and providing, to the second computing device, (i) a remaining portion of the transcription and (ii) instructions to output the remaining portion of the transcription using a speech synthesizer of the second computing device.

In some implementations, the actions further include before performing speech recognition on the audio data that corresponds to the utterance: determining that the audio data that corresponds to the utterance includes the particular, predefined hotword; and receiving data indicating that the second computing device is responding to the audio data.

In some implementations, providing, for output, the transcription that corresponds to the response comprises providing the transcription that corresponds to the response to a speech synthesizer.

In some implementations, the audio data that corresponds to the synthesized transcription is received by a third computing device that is configured to generate a response based on the audio data that corresponds to the synthesized transcription, the transcription of the additional audio data, and the utterance.

In some implementations, the actions further include after providing, for output, the transcription that corresponds to the response, receiving, by the first computing device, audio data that corresponds to a second utterance; based on the transcription of the additional audio data, based on the utterance, and based on the second utterance, generating an additional transcription that corresponds to a response to the audio data that corresponds to the second utterance; and providing, for output, the additional transcription.

In some implementations, the actions further include receiving data indicating a type of speech synthesizer used by the second computing device to output the additional audio data, wherein a type of speech synthesizer that received the transcription that corresponds to the response is different than the type of speech synthesizer used by the second computing device to output the additional audio data.

In some implementations, providing, for output, the transcription that corresponds to the response comprises providing the transcription to a display of the first computing device.

In some implementations, receiving data indicating that the second computing device is responding to the audio data includes receiving, from the second computing device, a short range radio signal that indicates that the second computing device is responding to the audio data. In some implementations, receiving data indicating that the second computing device is responding to the audio data includes receiving, from the second computing device and through a local network, data indicating that the second computing device is responding to the audio data. In some implementations, receiving data indicating that the second computing device is responding to the audio data includes receiving, from a server, data indicating that the second computing device is responding to the audio data.

In certain aspects, determining that the audio data that corresponds to the utterance includes the particular, predefined hotword includes the steps of extracting audio features of the audio data that corresponds to the utterance; generating a hotword confidence score by processing the audio features; determining that the hotword confidence score satisfies a hotword confidence threshold; and based on determining that the hotword confidence score satisfies a hotword confidence threshold, determining that the audio data that corresponds to the utterance includes the particular, predefined hotword.

In some implementations, generating a transcription that corresponds to a response to the additional audio data comprises determining user information that is associated with the transcription of the additional audio data that is associated with a first user of the first computing device or with a second user of the second computing device; and wherein the transcription is generated based on the user information.

In certain aspects, generating a transcription that corresponds to a response to the additional audio data comprises the actions of accessing data that is associated with the transcription of the additional audio data; and generating the transcription based on the accessed data.

The actions further include determining a location of the first computing device, and generating the transcription based on the location of the first computing device. The actions further include providing, to the second computing device or to a server, the audio data that corresponds to the utterance in response to receiving data indicating that the second computing device is responding to the audio data.

In some implementations, the actions further include generating a first audio fingerprint of the audio data that corresponds to the utterance; receiving, from the second computing device, a second audio fingerprint of the audio data that corresponds to the utterance; comparing the first audio fingerprint to the second audio fingerprint; and based on comparing the first audio fingerprint to the second audio fingerprint, determining that the audio data received by the first computing device corresponds to the audio data received by the second computing device.

In some implementations, further actions include receiving, from the second computing device or a server, a transcription of the audio data that corresponds to the utterance, wherein generating the transcription that corresponds to the response to the additional audio data is based further on the transcription of the audio data that corresponds to the utterance.

In some implementations, the first computing device and the second computing device are able to detect short range radio communications from each other.

In some implementations, the first computing device and the second computing device are co-located.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. First, a collaborative voice controlled device system can make conversational search smarter and more natural by seamlessly providing multiple and sequential responses in a coordinated fashion similar to an actual conversation. Before providing a response to a query, a device may process the available information to generate a response. Each device can provide a unique response which can add to the conversation and can be user-specific or location-specific. The device may either provide the unique response or pass the information to another device. Providing information to another devices allows the device to make conversations more human-like by intentionally leaving out parts of the unique response so that other devices may complete the response. Second, a collaborative voice controlled device system can resolve the problem of multiple devices responding to the same query in a nearly identical manner. For example, communication between the devices allows the devices to determine how and when the devices respond to the query. This reduces the wastage of computing resources and battery power by avoiding redundant output. Third, the collaborative voice controlled device system can be used to improve speech processing by using multiple devices with different microphones at different locations to process audio data to get a more accurate transcription of the audio data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
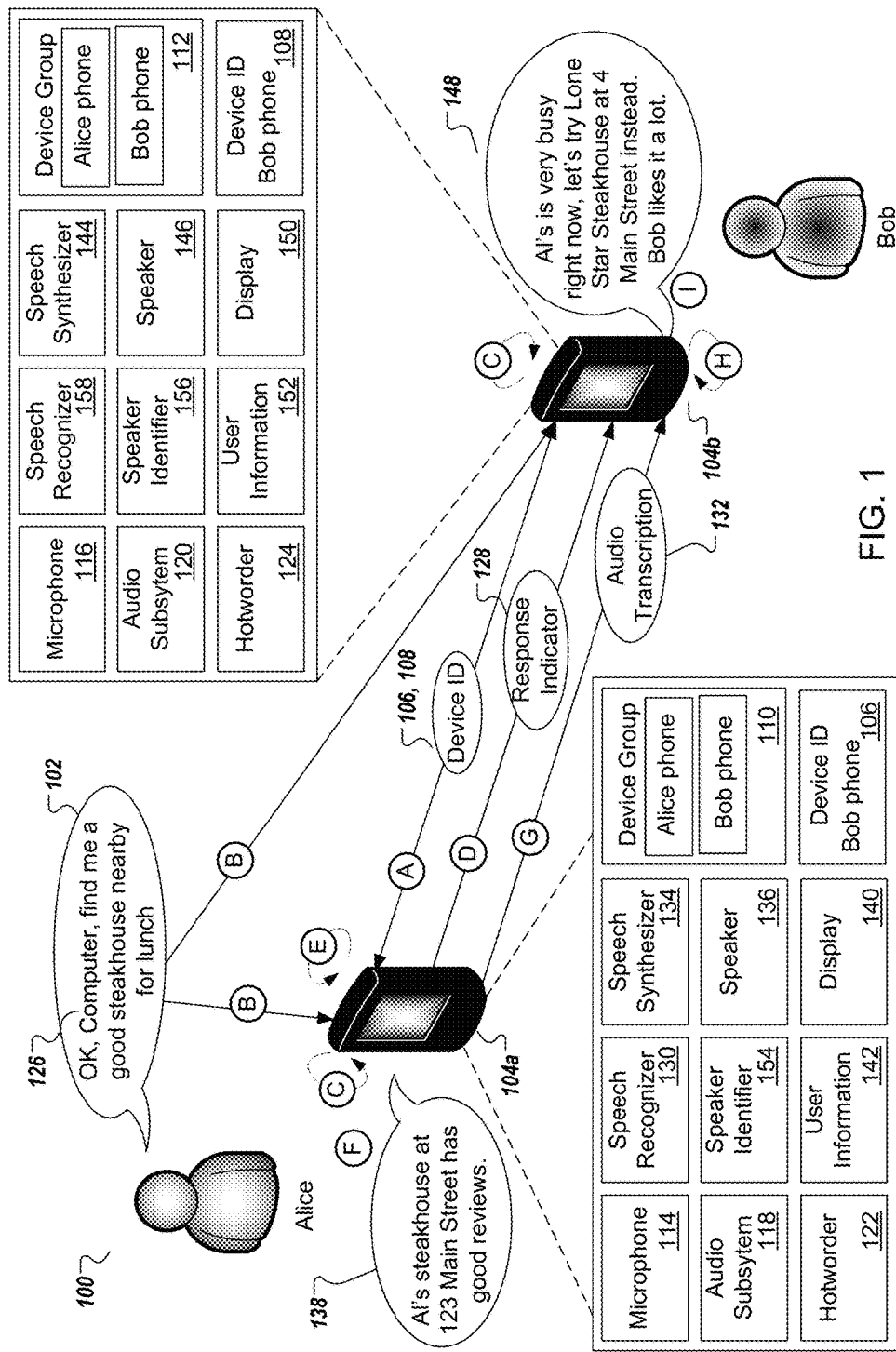
FIG. 1 is a diagram of an example system for collaboration between multiple voice controlled devices.

FIG. 1 is a diagram of an example system 100 for collaboration between multiple voice controlled devices. In general, the system 100 illustrates a user Alice speaking an utterance 102 "OK computer, find me a good steakhouse nearby for lunch" that is detected by computing devices 104a and 104b. Computing device 104a processes the utterance and provides a response "Al's steakhouse at 123 Main Street has good reviews." Based on the utterance 102 and the response provided by computing device 104*a*, computing device 104*b* generates and provides a follow-up response "Al's is very busy right now, let's try Lone Star Steakhouse at 4 Main Street instead. Bob likes it a lot."

In more detail, the sequence of events in FIG. 1 begins at stage A. The computing devices 104*a* and 104*b* identify each other and other computing devices that are configured to respond to a particular, predefined hotword. In some implementations, the computing devices identify each other by searching the local network for other computing devices that are configured to respond to the hotword. For example, computing device 104*b* may search the local area network, and may identify computing device 104*a* as another computing device that is configured to respond to the hotword.

In some implementations, the computing devices identify other computing devices that are configured to respond to the hotword by identifying the user who is logged into each device. In some implementations, and in this example, computing device 104*a* may be associated with the user Alice and computing device 104*b* may be associated with a user Bob. In this case, Alice may be logged into computing device 104*a* and Bob may be logged into computing device 104*b*. Alice and Bob may be a part of a group of users with associated devices that may be configured to respond to a particular, predefined hotword. The group of users may be a group of co-workers at a company, or a group of friends. Each computing device may share information that is related to the user who is logged into the particular computing device, such as a user identifier.

In some implementations, both computing devices 104*a* and 104*b* may be associated with the same user. For example, Alice may be logged into computing devices 104*a* and 104*b*. Alice may have the computing device 104*a* in her hand. The computing device 104*b* may be a home assistant located on a table. Computing device 104*a* detects computing devices 104*b* and each computing device shares information that is related to the user who is logged into the computing device, such as a user identifier.

In some implementations, once the computing device 104*b* has identified 104*a* as a computing devices that is configured to respond to the same hotword, the computing devices 104*a* and 104*b* may share and store their respective device identifiers 106 and 108. The identifiers may be based on a type of device, an IP address of the device, a MAC address, a name given to the device by a user, or any combinations thereof. For example, the device identifier 106 for computing device 104*a* may be "Alice phone". The device identifier 108 for computing device 104*b* may be "Bob phone". The computing devices 104*a* and 104*b* have respective device groups 110 and 112 where the computing devices store the device identifiers.

In some implementations, there may be more than two computing devices that are configured to respond to the particular hotword. Each computing device may identify the other computing devices that are configured to respond to the particular hotword, and may store the device identifiers for the other computing devices in the device group.

In some implementations, the computing devices may be co-located such that they share a same location or place. The computing devices may be within a predetermined distance of each other, or within the same room. The computing devices may be in the same acoustic environment. In some examples, the computing devices may be co-located virtually, e.g., when the computing devices participate in a telephone or video conference.

In some implementations, the computing devices may identify other computing devices that are configured to respond to the hotword through short range communication such as the Bluetooth protocol or the Bluetooth Low Energy (BLE) protocol. For example, the computing device 104*a* may transmit a signal through short range communication searching for other computing devices that are configured to respond to the hotword. The computing devices may be located within a particular distance of each other, such as ten meters, as determined by GPS or signal strength. The first computing device may detect a strength of a signal being transmitted by the second computing device and translate that to a corresponding distance. The computing devices may employ one of these techniques or a combination of them to identify other computing devices that are configured to respond to the hotword.

In this example and in stage B, Alice speaks the utterance 102, "OK computer, find me a good steakhouse nearby for lunch," in the vicinity of the computing devices 104*a* and 104*b*. The utterance 102 is detected by microphones 114 and 116 of computing devices 104*a* and 104*b* respectively.

The respective microphones 114 and 116 of the computing devices 104*a* and 104*b* provide audio data to respective audio subsystems 118 and 120. The respective audio subsystems 118 and 120 may buffer, filter, and digitize the audio data. In some implementations, the computing device may also perform endpointing on the audio data. The audio subsystems 118 and 120 may include audio buffers to store filtered and digitized audio data.

In stage C, the respective audio subsystem 118 and 120 of each computing device 104*a* and 104*b* provide the processed audio data to respective hotworders 122 and 124. The respective hotworders 122 and 124 compare the processed audio data to known hotword data and compute respective hotword confidence scores that indicate the likelihood that the utterance 102 includes a hotword 126.

The hotworder 124 of computing device 104*b* may extract audio features from the processed audio data such as filterbank energies or mel-frequency cepstral coefficients. The hotworder 124 may use classifying windows to process these audio features such as by using a support vector machine or a neural network. Based on the processing of the audio features, if the hotworder 124 of computing device 104*b* computes a hotword confidence score that exceeds a threshold hotword confidence score, the computing device 104*b* determines that the utterance 102 includes the hotword 126. Similarly, the hotworder 122 of computing device 104*a* may determine that the utterance 102 includes the hotword 126.

In some implementations, one or more of the computing devices sends the processed audio data to a server and the server computes a hotword confidence score. In this instance, the server includes a hotworder similar to hotworders 122 and 124. The hotworder on the server may determine that the utterance 102 includes the hotword and sends the notification to the one or more computing devices.

In some implementations, the system determines that the audio data includes the hotword without performing speech recognition on the audio data.

In some implementations, each computing device may generate audio fingerprints of the received audio data. Computing device 104*b* may generate a first audio fingerprint of the audio data that corresponds to the utterance detected by microphone 114 of the computing device 104*a*. The computing device 104*a* may receive a second audio fingerprint of the audio data that corresponds to the utterance detected by microphone 116 of the computing device 104*b*. The audio fingerprints may be compared to determine if the computing devices 104*a* and 104*b* are responding to the same utterance.

In some implementation, the audio data from the computing devices may be sent to a server. The server may include an audio fingerprinting module to generate the audio fingerprints and perform the comparison. In some implementations, the computing devices may also send a device identifier with the audio data. In some implementations, the computing devices may also send location information associated with the computing devices with the audio data.

In stage D, the speech-enabled system 100 identifies one of the computing devices as the device that the utterance 102 is intended for. In this example, Alice may speak the utterance 102 towards the computing device 104a, which is in her hand. The computing device 104a is identified as the computing device that the utterance 102 is intended for. The computing device 104a notifies the other devices that were triggered by the utterance 102 that it will be processing the audio data. In this example, computing device 104a sends response indicator 128 indicating that it is responding to the audio data corresponding to the utterance 102 to computing device 104b.

In some implementations, the response indicator 128 indicating that 104a is responding to the audio data may be an ultrasonic or audible audio signal, or a short range radio signal such as Bluetooth. The signal is received by 104b and any other computing devices in the vicinity. In some implementations, the notification signal may include a particular frequency and/or pattern. For example, a notification signal may be twenty kilohertz to indicate that the second computing device will perform speech recognition on the audio data.

In some implementations, the response indicator 128 indicating that 104a is responding to the audio data may be received by 104b through a local network. In some implementations, the response indicator 128 indicating that 104a is responding to the audio data may be received by 104b through a server.

In some implementations, determining which device initially responds to a user utterance may involve determining which device is nearest to the user. The loudness of the audio data received by the computing device may reflect a distance between the computing device and the source of the audio. For direct path signal propagation, the loudness is approximately inversely proportional to the square of the distance between the source and the receiver.

In some implementations, the computing devices may calculate a loudness score for the audio data using one or a combination of the following techniques. One technique may be to calculate the sound pressure or sound pressure level as received by the microphone when the user is speaking the utterance. The higher the sound pressure or sound pressure level, the higher the loudness. A second technique is to calculate the root mean square of the audio data. The higher the root mean square value of the audio data, the higher the loudness. A third technique is to calculate the sound intensity of the audio data. The higher the sound intensity of the audio data, the higher the loudness. A fourth technique is to calculate the sound power of the audio data. The higher the sound power, the higher the loudness. The computing device with the highest loudness score may be identified as the computing device which responds initially to the utterance 102.

In some implementations, determining which device initially responds to a user utterance may comprise determining which device receives the clearest audio data. Each computing device may calculate a clarity score which may be determined based on the signal-to-noise-ratio of the audio data associated with the utterance 102. The computing device with the highest clarity score may be identified as the computing device which responds initially to the utterance 102.

In some implementations, determining which device initially responds to a user utterance may comprise performing speaker identification on the audio data corresponding to the utterance 102. This may involve providing the audio data to the respective speaker identification modules 154 and 156 of computing devices 104a and 104b. The speaker identification modules 154 and 156 may be implemented in software that runs on a processor. The speaker identification modules 154 and 156 analyze the audio data to calculate a respective speaker identity confidence score indicating a confidence that the identity of the speaker matches the user associated with the computing device. For example, speaker identification module 154 of computing device 104a may calculate a confidence score of 0.8, and speaker identification module 156 of computing device 104b may calculate a speaker identification confidence score of 0.05, indicating a greater confidence that the speaker is Alice.

In some implementations, the computing devices may use one of these scores or a combination of them to determine a total confidence score. The total confidence score may be used to identify the computing device that initially responds to the user utterance 102. In some implementations, each computing device may transmit the respective score, or combination of scores and the respective device identifier to the other computing devices in the device group.

In some implementations, each computing device may use a score comparer to compare the total confidence scores of all the computing devices that are configured to respond to the hotword. The computing device with the highest total confidence score may initiate speech recognition on the audio data following the hotword. A computing device that does not have the highest total confidence score may wait for data indicating that another computing device has begun processing the audio data.

In some implementations, determining which device initially responds to a user utterance may comprise analyzing the settings of the computing device. For example, if the utterance is in French and there is one phone with French language settings in the vicinity, it is probably the computing device that the utterance was intended for.

In some implementations, determining which device initially responds to a user utterance may be done by analyzing the semantics of the command or the query included in the utterance and correlating it with the state and information of the computing devices. For example, if the query is "Who am I meeting with at two o'clock?" the speech-enabled system may determine that the query is intended for the computing device which is synchronized with a calendar, and has an appointment at two o'clock.

In stage E, the computing device 104a processes the audio data that corresponds to the utterance 102. The audio data may be provided to a speech recognizer 130, which may perform speech recognition on the portion of the audio data that follows the hotword. In this example, the speech recognizer 130 may identify the words "find me a good steakhouse nearby for lunch" and identify and execute the command.

In some implementations, the computing device 104a may send the portion of the audio data following the hotword to a server. The server may include a speech recognizer similar to the speech recognizer 130. The speech recognizer included in the server may perform speech recognition and provide a transcription of the audio data to the computing device 104a. The computing device 104a can then identify the words and execute the command.

In some implementations, the computing device 104a may generate a response to the audio data by accessing data associated with the audio data. In this example, the computing device 104a identifies the command "find me a good steakhouse nearby for lunch" in the utterance 102, and may perform a web search to find steakhouses nearby. The computing device 104a may also access customer reviews from the web to select a steakhouse, and to generate a transcription 132 corresponding to the response "Al's steakhouse at 123 Main Street has good reviews".

In stage F, the computing device 104a provides as output the generated response to the audio data associated with the utterance 102. In some implementations, this includes providing the transcription 132 that corresponds to the response to a speech synthesizer 134. The output of the speech synthesizer may be provided to a speaker 136 of the computing device. In this example the computing device 104a provides, as output, the additional audio data 138 "Al's steakhouse at 123 Main Street has good reviews."

In some implementations, the transcription 132 that corresponds to the response may be sent to a display 140 of the computing device 104a.

In stage G, computing device 104b sends the transcription 132 that corresponds to the response to computing device 104b and any other identified computing devices.

In some implementations, one or more of the computer devices may include a privacy module that manages or filters the data being transmitted or received based on user settings or preferences.

In stage H, computing device 104b processes the audio data corresponding to the utterance 102 and the transcription 132 of the additional audio data provided by computing device 104b, and generates a new transcription that corresponds to a response. In this example, computing device generates a response based on the command "find me a good steakhouse nearby for lunch" and the response provided by computing device 104a, "Al's steakhouse at 123 Main Street has good reviews".

In some implementations, the computing device 104b may generate a response based on user information 142 that is associated with the audio data. The user information may be associated with a user of the computing device (e.g., calendar, contacts, media files, personal preferences, etc.). In this example, based on the command "find me a good steakhouse nearby for lunch" and the response provided by computing device 104a, "Al's steakhouse at 123 Main Street has good reviews", the computing device 104b may access an online reservation system on the internet and may access Bob's restaurant reviews or personal preferences to generate a transcription corresponding to the response "Al's is very busy right now, let's try Lone Star Steakhouse at 4 Main Street instead. Bob likes it a lot."

In some implementations, computing device 104b may receive a transcription of the audio data that corresponds to the utterance 102, and use this transcription in addition to the transcription of the response provided by computing device 104b and the audio data corresponding to the utterance. This may help in cases when computing device 104b may be further away from the user speaking the utterance. Since computing device is closer to the user, it may provide a more accurate transcription of the utterance 102. This also eliminates the need to perform speech recognition twice on the same audio data.

In stage I, the computing device 104b provides the generated output in response to the utterance 102 and the additional audio data provided by computing device 104a. In some implementations, this includes providing the transcription that corresponds to the response to a speech synthesizer 144. The output of the speech synthesizer may be provided to a speaker 146 of the computing device 104b. In this example the computing device 104a provides, as output, the utterance 148 "Al's is very busy right now, let's try Lone Star Steakhouse at 4 Main Street instead. Bob likes it a lot".

In some implementations, providing, for output, the transcription that corresponds to the response comprises providing the transcription to a display 150 of the computing device 104a.

In some implementations, the parameters covering the voice produced by the speech synthesizer (e.g., pitch, tone, accent, speed, inflection, etc.) may be adjusted. This allows for the creation of custom voices for each computing device, improving user experience. The speech synthesizer may use a form of machine learning to generate the parametric representation of speech to synthesize the speech. For example, a neural network may be used to generate the speech parameters.

In some implementations, one or more of the computing devices may follow an initial response with a question or a prompt for the user to respond to before proceeding further. For example, if Alice speaks the utterance "OK computer, find me a good restaurant nearby for lunch", Alice's device may provide a list of restaurants nearby. Bob's device may access Bob's personal information and provide the response "Bob loves Argentinian steak, there are a lot of good steakhouses nearby. Would you like to try one?" One or more of the computing devices may wait for a response to the question and continue based on the response. Upon receiving the response "Yes", Bob's device might provide a follow-up response "Rural Society on 123 Madison Avenue has good reviews."

In some implementations, the collaborative voice-controlled device system may have more than two devices. For example, a group of three users Alice, Bob and Carl may be trying to obtain directions to a nearby park and each may have their own device. Alice speaks the utterance "OK computer, give me directions to Prospect Park". Alice's device may access Alice's personal information, which indicates that she usually uses public transit. Alice's device may use that information, along with the information obtained from a public transit web tool to provide the response, "There's a train leaving from Carol Square Station in 12 minutes, it arrives at Prospect Park Station at 4:59 pm. It's a 4 minute walk to Carol Square Station, and a 5 minute walk from Prospect Park Station to the entrance of Prospect Park." Bob's device may receive this response through a network. In generating a response, Bob's device may access Bob's personal information and see that Bob usually prefers to drive, and that he has parked his car at a nearby garage. The devices may detect the location change to the garage and discussion among Alice, Bob, and Carl to drive instead of take public transportation. Bob's device may use a web map search tool to provide driving directions to the park. During the drive, Carl's device may receive the directions through the network and may access a real-time traffic tool to determine that there is a faster route and provide a response, "If you take Main St instead of Rock Rd, it will be 5 minutes faster."

In some implementations, before providing a response, the devices may collaborate with each other to generate more complete and relevant responses. This may be done by using the available information, and sharing users' personal information provided a user selected to share personal information beforehand. For example, if Alice says "OK computer, find me a good restaurant nearby", all the devices may begin to process the query before any response is provided. Bob's phone may send data to the other devices indicating that Bob is a vegetarian. This allows the devices to tailor their responses to only provide vegetarian-friendly restaurant options.

In some implementations, the devices can either provide a response or pass the information to another device. Conversations may be made more human-like or humorous by intentionally coordinating the responses, or by leaving out parts of a response by a device, to be completed by other devices. For example, in the above example, where Bob's phone has shared data indicating that Bob is a vegetarian, in response to "Shall we try Al's Steakhouse on 123 Main Street?", Alice's phone does not provide a response and waits for Bob's phone to provide the response "Are steaks vegetarian?"

Figure 2:
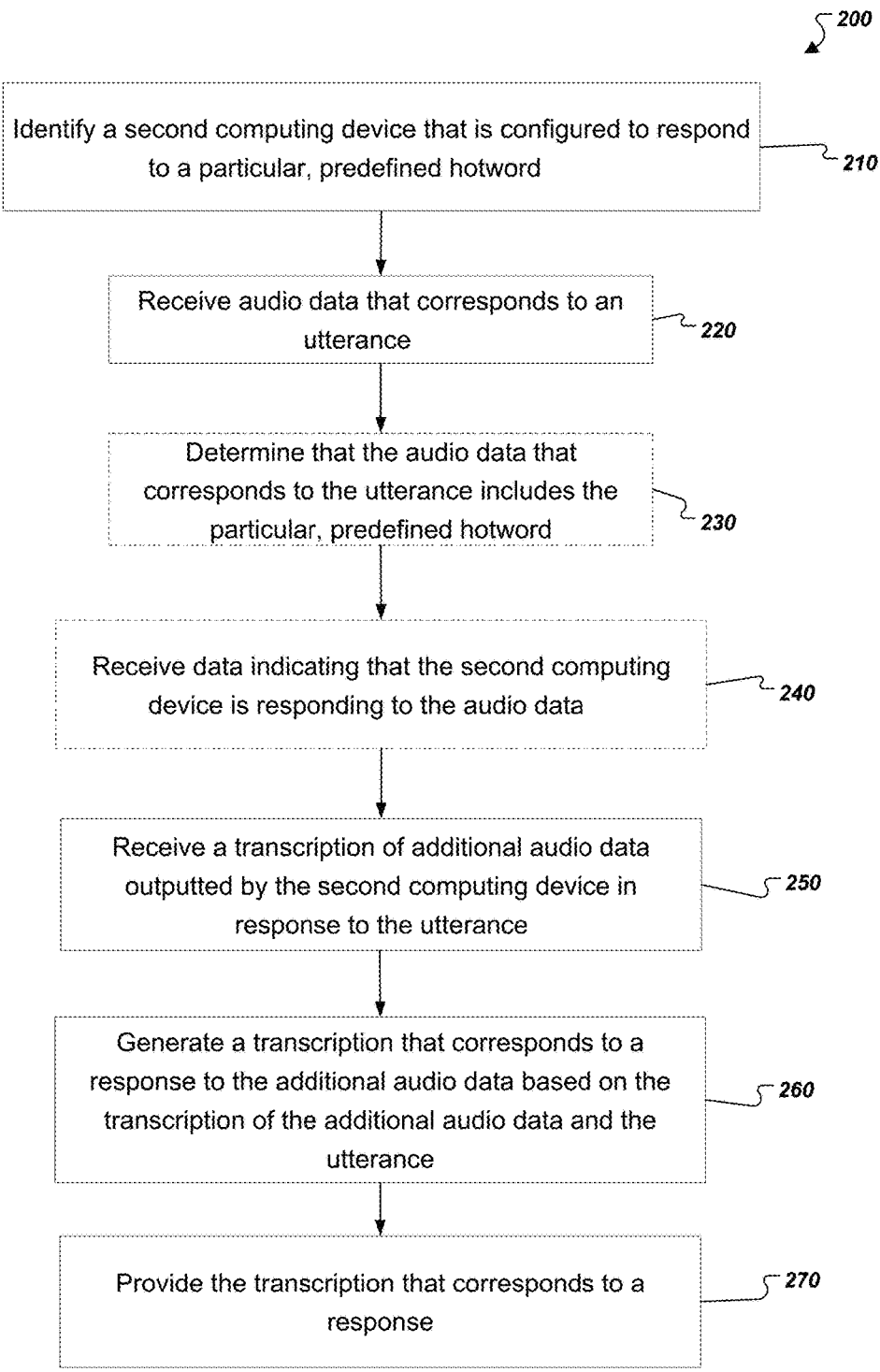
FIG. 2 is a diagram of an example process for collaboration between multiple voice controlled devices.

FIG. 2 is a diagram of an example process 200 for collaboration between multiple voice controlled devices. The process 200 may be performed by a computing device such as the computing devices 104a and 104b from FIG. 1. The process 200 determines that a second computing device is processing an audio utterance, and receives a transcription of a response to the utterance. The process 200 uses the utterance and transcription of the response to generate a response.

The first computing device identifies a second computing device that is configured to respond to a particular, predefined hotword (210). In some implementations, the first computing device may do this by periodically transmitting an ultrasound or radio signal that requests a response. For example, the first computing device may transmit an ultrasound that is 20.5 kilohertz when searching for computing devices that recognize hotwords. In response, computing devices that receive the 20.5 kilohertz ultrasound may respond with a twenty-one kilohertz ultrasound. In some implementations, the ultrasonic or radio signal can be encoded with information identifying the first computing device.

In some implementations, the first computing device may identify other computing devices that belong to the same user. While setting up a new computing device, part of the setup procedure may be to identify other computing devices that belong to the same user. This may be accomplished by detecting other devices that the user is logged into. Once the first computing device identifies another computing device, the computing devices may exchange data using an ultrasonic frequency signal that encodes a bit stream so that the computing devices can exchange data when identifying a hotword.

The ultrasonic frequency signal may be transmitted through a speaker. For example, a user may be setting up a home assistant and part of the set up process is to search for other computing device that are nearby and that respond to hotwords. The home assistant may identify a phone and a tablet that the user is logged into. As an example, the thermostat, phone, and tablet may exchange data using an ultrasonic signal upon identifying that each are co-located in a same room. The ultrasonic signal may include a bit stream identifying each of the devices. The devices may use the ultrasonic channel upon detection of a hotword.

In some implementations, the computing devices may identify other computing devices that are configured to respond to the hotword by identifying computing devices that are configured to respond when the hotword is spoken by the same user through speaker identification. For example, computing devices 104a and 104b may be configured to respond to the voice of Alice when Alice speaks the hotword. The computing devices share the speaker identification information by providing a user identifier for Alice to each other.

A user speaks the utterance and a microphone of the first computing device receives the audio data of the utterance (220). The first computing device processes the audio data by buffering, filtering, endpointing, and digitizing the audio data. As an example, the user may utter "OK computer" and the microphone of the first computing device receives the audio data that corresponds to "OK computer." An audio subsystem of the first computing device samples, buffers, filters, and performs endpointing on the audio data for further processing by the first computing device.

In some implementations, the first computing device determines that the audio data that corresponds to the utterance includes the particular, predefined hotword (230). The audio features of the audio data that corresponds to the utterance are extracted. In some implementations, the likelihood that the utterance includes a hotword may be represented by a hotword confidence score. The hotword confidence score is generated by processing the audio features.

The hotword confidence score may be normalized to a scale from one to one where one indicates the highest likelihood that the utterance includes a hotword. The first computing device may compare the hotword confidence score to a hotword confidence threshold. If the hotword confidence score satisfies the hotword confidence threshold, the first computing device may determine that the audio data that corresponds to the utterance includes the particular, predefined hotword.

If the hotword confidence score does not satisfy the hotword confidence threshold, then the system determines that the audio data does not include the hotword. For example, if the hotword confidence threshold is 0.75, then audio data with a hotword confidence score above 0.75 would be labeled as including the hotword and audio data with hotword confidence score below 0.75 would be labeled as not including the hotword.

In some implementations, the system determines that the audio data includes the hotword without performing speech recognition on the audio data.

In some implementations, the first computing device determines the likelihood that the utterance includes a particular, predefined hotword by comparing the audio data of the utterance to a group of audio samples that include the hotword.

In some implementations, the first computing device receives data indicating that the second computing device is responding to the audio data (240). This could be data from a server, or from the second computing device and through a local network indicating that the second computing device is responding to the audio data. The data could be a notification signal such as an ultrasound, a short range radio signal, or a local area wireless signal to indicate that the second computing device is initiating speech recognition processing on the audio data. To receive the signal, the first computing device may ensure that the microphone of the first computing device remains active, that a short range radio receiver is active, or that another radio such a local area wireless radio is active.

The first computing device receives a transcription of additional audio data outputted by the second computing device in response to the utterance (250).

In some implementations, the second computing device may generate a transcription of additional audio data in response to the utterance response to the received data based on user information that is associated with the audio data. The user information may be associated with a user of the first computing device (e.g., calendar, contacts, media files, social media information, personal preferences, etc.).

For example, if Bob speaks the utterance "OK Computer, schedule a meeting with Bob this afternoon.", computing device 104b might use information from the calendar associated with Bob stored on the computing device 104b to provide a suggestion for a meeting time and may provide the response "Does either 3 or 4 pm work?"

The first computing device generates a transcription that corresponds to a response to the additional audio data based on the transcription of the additional audio data and the utterance (260).

In some implementations, one or more of the computing device 104a and 104b may determine a location of the computing device, and use the location information to generate a response. For example, if computing device 104a determines that it is in a place where it might be inappropriate to respond audibly, e.g., in a library, the computing device 104a might not provide a response, or it may provide the response to the display 140 of the computing device 104A.

In some implementations, the computing device might access data that is associated with the transcription of the additional audio data and generate the transcription based on the accessed data. For example, if the transcription of the additional audio data includes a query asking for suggestions for restaurants in the vicinity, the computing device might perform a web search to access data corresponding to restaurants nearby. The computing device may use this accessed data to generate the transcription corresponding to the response.

The computing device provides, for output, the transcription that corresponds to the response (270). In some implementations, this includes providing the transcription that corresponds to the response to a speech synthesizer. The output of the speech synthesizer may be provided to an audio speaker of the computing device.

In some implementations, the transcription that corresponds to the response may be provided to a display of the computing device.

In some implementations, collaboration among multiple devices might be used to improve the quality of speech recognition. Since different devices have different sensors (microphones), and are positioned differently in the user's surroundings, it could be that none of them correctly transcribed the whole user query but combining the transcriptions of all the computing devices might match the query perfectly. In another example, if a user is moving around a space, and different computing devices are close to the user at different times during the speaking of the query, by using the transcriptions from each of the computing devices and combining them, a more accurate transcription may be obtained.

Figure 3:
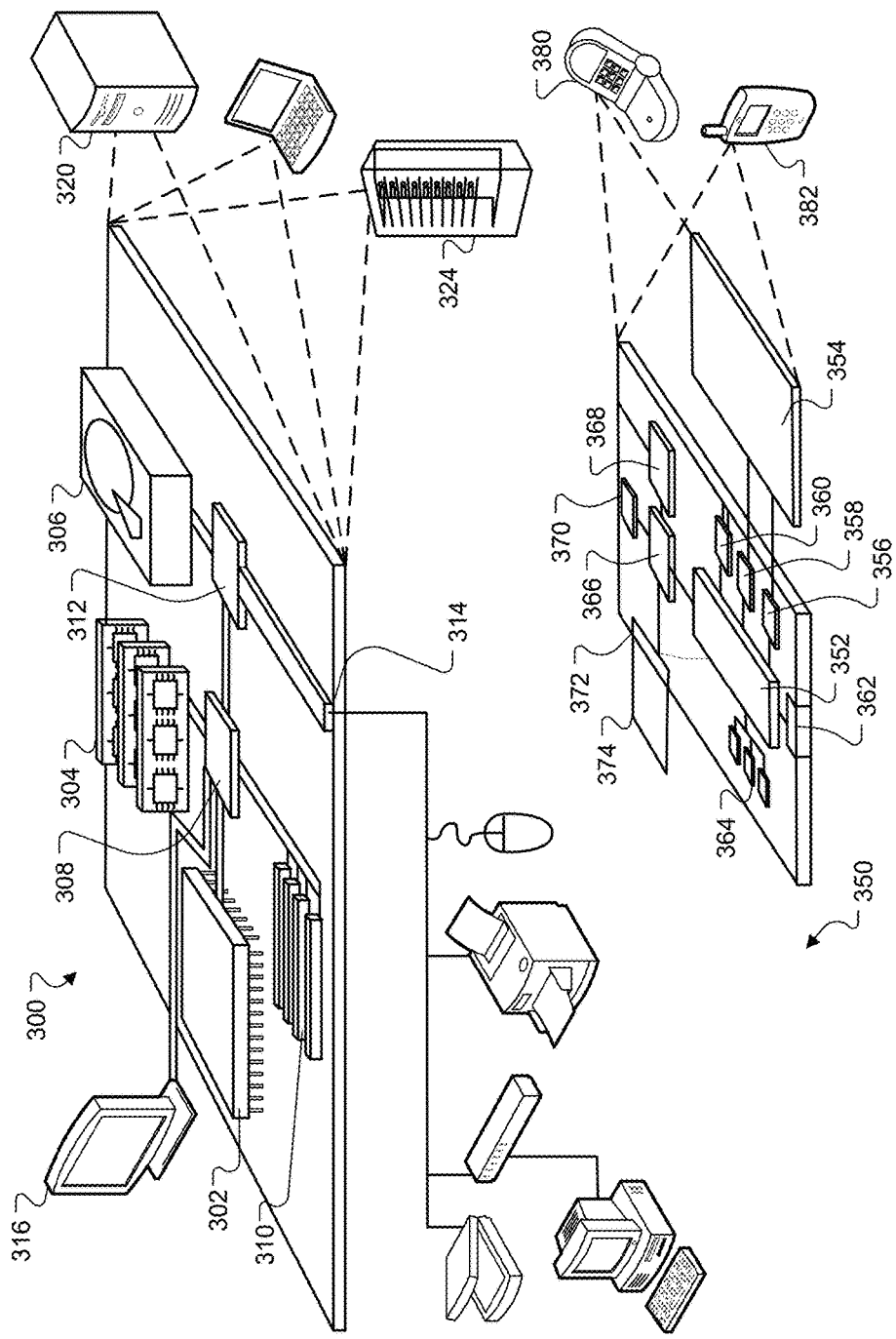
FIG. 3 shows an example of a computing device and a mobile computing device.

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provide as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier such that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
   identifying, by a first computing device, a second computing device that is configured to respond to a particular, predefined hotword;
   receiving, by the first computing device, audio data of an utterance spoken by a user;
   determining, by the first computing device, that the utterance includes the particular, predefined hotword;
   receiving, by the first computing device, a transcription of an initial response to the utterance provided by the second computing device, wherein the initial response comprises synthesized speech audibly outputted by the second computing device;
   based on the transcription of the initial response and based on the utterance, generating, by the first computing device, a subsequent response to the initial response; and
   providing, for output by the first computing device, audio data of the subsequent response or a transcription of the subsequent response.

2. The method of claim 1, wherein providing, for output, audio data of the subsequent response or a transcription of the subsequent response comprises:
   providing, to a speech synthesizer of the first computing device, an initial portion of the transcription of the subsequent response; and
   providing, to the second computing device, (i) a remaining portion of the transcription of the subsequent response and (ii) instructions to audibly output synthesized speech of the remaining portion of the transcription of the subsequent response.

3. The method of claim 1, comprising:
   after providing, for output, the transcription that corresponds to the response, receiving, by the first computing device, audio data of a second utterance;
   based on the transcription of the initial response, based on the utterance, and based on the second utterance, generating, by the first computing device, an additional transcription of an additional response to the second utterance; and
   providing, for output by the first computing device, the additional transcription.

4. The method of claim 1, wherein providing, for output, audio data of the subsequent response or a transcription of the subsequent response comprises:
   providing the transcription to a display of the first computing device.

5. The method of claim 1, wherein generating a subsequent response to the initial response comprises:
   determining user information that is associated with a first user of the first computing device or with a second user of the second computing device; and
   wherein generating the subsequent response to the initial response is based on the user information.

6. The method of claim 1, wherein generating subsequent response to the initial response comprises:
   accessing data that is associated with the initial response; and
   wherein generating the subsequent response to the initial response is based on the accessed data.

7. The method of claim 1, comprising:
   determining, by the first computing device, a location of the first computing device,
   wherein generating the subsequent response to the initial response is based on the location of the first computing device.

8. The method of claim 1, comprising:
   generating, by the first computing device, a first audio fingerprint of the audio data of the utterance;
   receiving, from the second computing device, a second audio fingerprint of the audio data of the utterance;
   comparing, by the first computing device, the first audio fingerprint to the second audio fingerprint; and
   based on comparing the first audio fingerprint to the second audio fingerprint, determining, by the first computing device, that the audio data received by the first computing device represents the same utterance as the audio data received by the second computing device.

9. The method of claim 1, wherein the first computing device and the second computing device are configured to communicate with each other using short range radio.

10. The method of claim 1, wherein the first computing device and the second computing device are co-located.

11. The method of claim 1, wherein receiving the transcription of the initial response to the utterance provided by the second computing device comprises:
receiving, from the second computing device, the transcription of the initial response to the utterance provided by the second computing device.

12. The method of claim 1, wherein providing, for output, audio data of the subsequent response or a transcription of the subsequent response comprises:
providing the transcription the subsequent response to a speech synthesizer.

13. The method of claim 12, wherein synthesized speech of a transcription of the subsequent response is received by a third computing device that is configured to generate a response based on the synthesized speech of the transcription of the subsequent response, the transcription of the initial response, and the utterance.

14. The method of claim 1, comprising:
determining that the utterance includes the particular, predefined hotword by:
determining that the utterance includes the particular, predefined hotword without preforming speech recognition on the audio data; and
receiving data indicating that the second computing device will output the initial response to the utterance.

15. The method of claim 14, comprising:
receiving data indicating that the second computing device will output the initial response to the utterance by:
receiving, from the second computing device, a short range radio signal that indicates that the second computing device will output the initial response to the utterance;
receiving, from the second computing device and through a local network, data indicating that the second computing device will output the initial response to the utterance; or
receiving, from a server, data indicating that the second computing device will output the initial response to the utterance.

16. The method of claim 14, wherein determining that the utterance includes the particular, predefined hotword without preforming speech recognition on the audio data comprises:
extracting audio features of the audio data of the utterance;
generating a hotword confidence score by processing the audio features;
determining that the hotword confidence score satisfies a hotword confidence threshold; and
based on determining that the hotword confidence score satisfies a hotword confidence threshold, determining that the utterance includes the particular, predefined hotword.

17. The method of claim 15, comprising:
in response to receiving data indicating that the second computing device will output the initial response to the utterance, providing, by the first computing device and to the second computing device or to a server, the audio data of the utterance.

18. A system comprising:
one or more computers and one or more storage devices storing instructions that are operable, when executed by the one or more computers, to cause the one or more computers to perform operations comprising:
identifying, by a first computing device, a second computing device that is configured to respond to a particular, predefined hotword;
receiving, by the first computing device, audio data of an utterance spoken by a user;
determining, by the first computing device, that the utterance includes the particular, predefined hotword;
receiving, by the first computing device, a transcription of an initial response to the utterance provided by the second computing device, wherein the initial response comprises synthesized speech audibly outputted by the second computing device;
based on the transcription of the initial response and based on the utterance, generating, by the first computing device, a subsequent response to the initial response; and
providing, for output by the first computing device, audio data of the subsequent response or a transcription of the subsequent response.

19. A non-transitory computer-readable medium storing software comprising instructions executable by one or more computers which, upon such execution, cause the one or more computers to perform operations comprising:
identifying, by a first computing device, a second computing device that is configured to respond to a particular, predefined hotword;
receiving, by the first computing device, audio data of an utterance spoken by a user;
determining, by the first computing device, that the utterance includes the particular, predefined hotword;
receiving, by the first computing device, a transcription of an initial response to the utterance provided by the second computing device, wherein the initial response comprises synthesized speech audibly outputted by the second computing device;
based on the transcription of the initial response and based on the utterance, generating, by the first computing device, a subsequent response to the initial response; and
providing, for output by the first computing device, audio data of the subsequent response or a transcription of the subsequent response.

* * * * *